July 10, 1951 R. N. DOBLE 2,560,093
LAWN SEEDER
Filed May 6, 1949 2 Sheets-Sheet 1
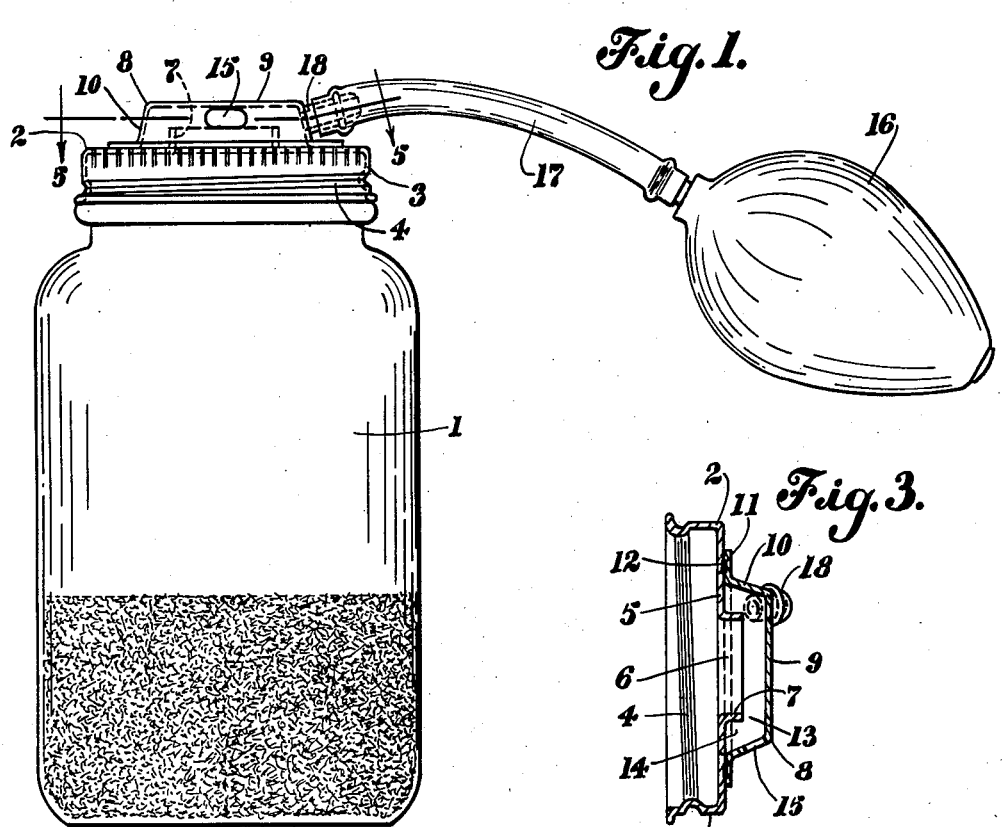
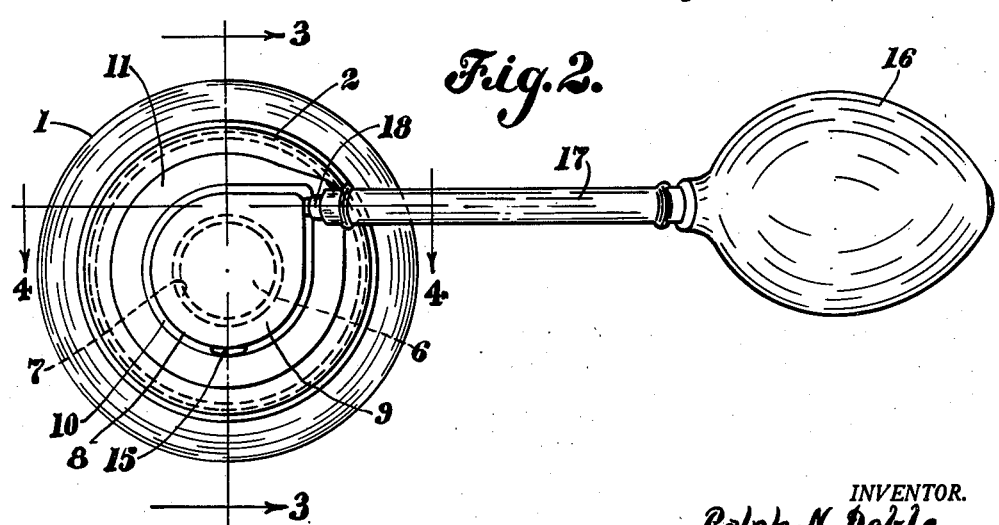
INVENTOR.
Ralph N. Doble.
BY Heard Smith Tennant
Attorneys July 10, 1951     R. N. DOBLE     2,560,093
LAWN SEEDER
Filed May 6, 1949                       2 Sheets-Sheet 2
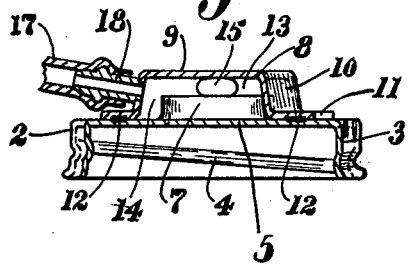
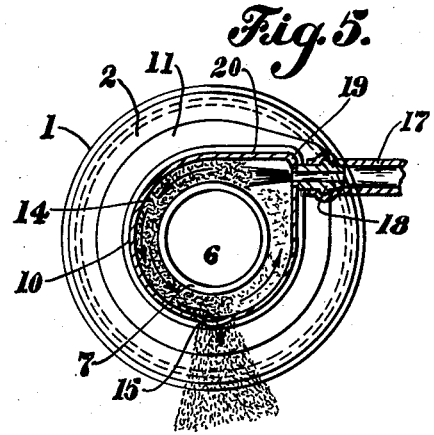
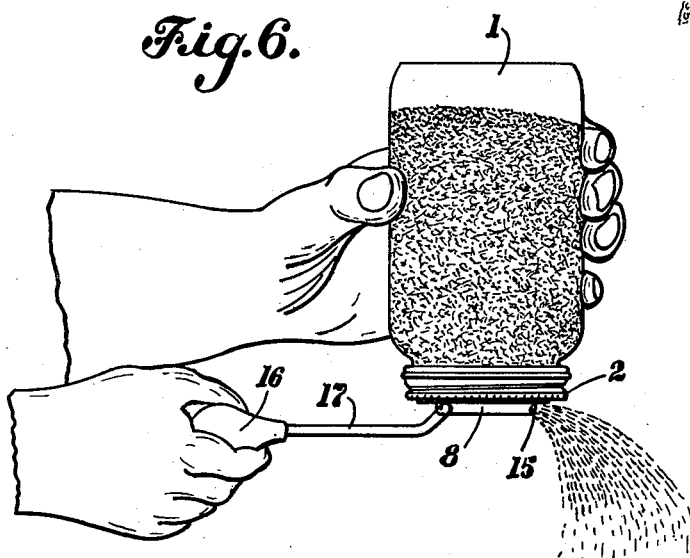
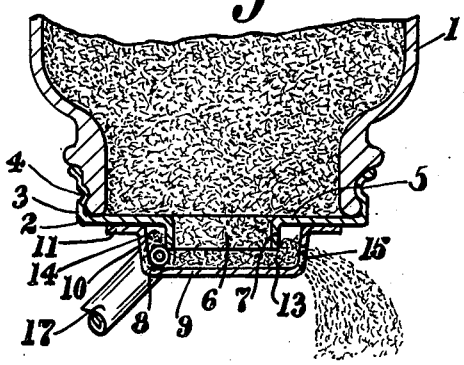
INVENTOR.
Ralph N. Doble.
BY Heard Smith & Tennant
Attorneys Patented July 10, 1951

2,560,093

UNITED STATES PATENT OFFICE 2,560,093

LAWN SEEDER

Ralph N. Doble, Hingham, Mass.

Application May 6, 1949, Serial No. 91,795

3 Claims. (Cl. 222—193)

This invention relates to a device for delivering granular material in the form of a spray, and while the invention is capable of thus delivering various kinds of granular material, yet it has been especially designed as a hand lawn seeder by which grass seed can be spread on lawns or small plots of ground.

In the care of lawns it is often desirable to add grass seed to certain portions of the lawn where the turf is thin, or perhaps to re-seed entirely such portions of the lawn. Because of the minute size of grass seed, is is difficult, if not impossible, to spread the seed evenly over the ground surface by sifting it through one's fingers. When this procedure is followed, the grass seed is almost certain to be deposited on the ground very unevenly so that in some areas the seed will be all together too thick and in other areas there may be little or no seed.

It is, therefore, one object of my invention to provide a portable hand seeder by which grass seed or other similar granular material can be evenly spread over the ground surface.

A further object of the invention is to provide a device of this type which is simple in construction and inexpensive to manufacture, and which can be easily and successfully used by anyone.

As stated above, while the device has been especially designed for scattering or sowing grass seed, yet it is equally applicable for scattering or sowing other granular material such for instance as chemical fertilizer, insecticide, etc.

In the drawings, wherein I have illustrated a selected embodiment of my invention, Fig. 1 is a side view of a device embodying the invention.

Fig. 2 is a top plan view thereof.

Fig. 3 is a section through the closure element on the line 3—3, Fig. 2.

Fig. 4 is a section through the closure on the line 4—4, Fig. 2.

Fig. 5 is a section on the line 5—5, Fig. 1 showing the manner in which the device operates to deliver the grass seed or other granular material in spray form.

Fig. 6 shows the manner in which the device is used for scattering grass seed on a lawn.

Fig. 7 is a fragmentary sectional view on the line 3—3, Fig. 2 showing the device in use.

The device comprises a container 1 for the grass seed or other granular material and a closure element 2 by which the open end of the container is closed. Said closure element may be in the form of a screw cap having a skirt portion 3 provided with an inclined screw thread rib 4 adapted to have screw threaded engagement with a complemental groove formed in the neck of the container.

The closure 2 is formed with a body portion 5 that is provided with a central opening 6, said body portion being deformed to present an outwardly directed curb or flange 7 that surrounds the opening 6. The closure 2 is also formed with a hood member 8 which encloses the opening 6 and the curb 7 but is spaced therefrom. This hood 8 presents an end face or wall 9 and a side wall 10 which is permanently secured to the body portion 5 and is spaced from the side of the flange. For this purpose the edge of the side wall 10 is shown as presenting a flange 11 which rests on the body 5 and is spot welded thereto as indicated at 12. The end wall 9 of the hood 8 is spaced from the edge of the curb 7 as indicated at 13 and the side wall 10 of the hood forms with the curb 7 an annular passage 14. The body portion 5 forms a partition between the space within the skirt portion 3 and the annular passage 14.

The side wall 10 of the hood is formed with a discharge opening 15 through which the granular material is discharged in spray form. When the container is held in inverted position as shown in Fig. 6, the grass seed or other granular material will gravitate through the opening 6 within the hood and will flow into and partially fill the annular passage 14 as shown in Fig. 7.

Means are provided for giving the granular material in the passage 14 a rapid circulating motion through the passage, and during such motion a certain proportion of the granular material will be thrown out through the discharge opening 15 by centrifugal force and in the form of a spray as illustrated in Fig. 5.

As a convenient means for thus giving the grass seed or other granular material its rapid circulatory movement on the passage 14, I propose to use a device for delivering air under pressure into said passage 14 tangentially thereof. For this purpose there is provided a hand operated bulb 16 which is connected by a flexible pipe section 17 with a nipple 18 that is screwed to the wall 10 of the hood member 8, the nipple being so mounted that the air blast which is delivered therethrough when the bulb 16 is squeezed will have a direction tangential to the annular passage 14. To facilitate this the side wall 10 of the hood is made with the outwardly displaced portion 19 which presents a wall section 20 that is tangential with the circular portion of the side wall 10.

Each time that the bulb 16 is squeezed, the blast of air which is delivered through the nipple 18 will cause a rapid circulatory movement of the grass seed or other granular material in the passage 14 which will result in such grass seed or granular material being sprayed through the discharge opening 15 partly by the centrifugal force to which the circulating granular material is subjected, and partly by the air which escapes through said discharge opening each time the bulb is squeezed. The device is very easy to manipulate, because the operator may easily hold the container 1 in one hand while he squeezes the bulb 16 with the other as illustrated in Fig. 6 and by means of this device, the grass seed can be easily and evenly spread over any desired portion of a lawn.

I claim:

1. A device for sowing grass seed comprising a container for the grass seed to be spread, a closure therefor at the lower end thereof, said closure comprising a body portion having a central opening communicating with the interior of the container and surrounded by an outwardly directed annular flange and a hood element enclosing said flange but spaced therefrom both at its sides and at its edge and having a side wall that forms with the flange an annular passage, said hood element having a discharge opening in its side wall, and means to cause a rapid circulating movement of said granular material throughout said annular passage whereby during such circulating movement the material will be ejected through the discharge opening by centrifugal force.

2. A device for spreading grass seed comprising a container for the grass seed provided with an open lower end, a closure for closing the said open end, said closure having a partition provided with an opening communicating with the interior of the container and having an outwardly extending flange surrounding said opening, said closure also having a hood element enclosing said flange and presenting a side wall spaced from the side face of the flange and an end wall spaced from the edge of the flange, said side wall having a discharge opening and forming with the flange an annular passage which surrounds said opening, a hand-operated bulb, and means connecting said bulb to the hood element for delivery of an air blast into the annular passage in a direction tangential thereto, whereby such air blast produces a circulatory movement of the grass seed in said passage which results in the grass seed being sprayed through the discharge opening.

3. A device for dispensing granular material in the form of a spray comprising a container body open at its lower end, a closure for said open end provided with a transverse partition having a central opening communicating with the interior of the container body and also having an annular outwardly directed flange surrounding said opening, said closure presenting an annular side wall encircling said flange but spaced therefrom to provide therewith an annular passage surrounding the flange, and also presenting an end wall spaced from the edge of the flange, said side wall of the closure having a discharge opening communicating with the annular passage, and means to deliver air under pressure into said annular passage in a direction tangential thereto, whereby the granular material will be circulated rapidly around said air passage and will be delivered through the discharge opening partly by centrifugal force and partly by the air current.

RALPH N. DOBLE.

REFERENCES CITED

The following references are of record in the file of this patent:

UNITED STATES PATENTS

| Number | Name | Date |
| --- | --- | --- |
| 600,547 | Mazzanovich | Mar. 15, 1898 |
| 913,816 | Eckhardt | Mar. 2, 1909 |
| 1,458,341 | Hebert | June 12, 1923 |
| 1,554,991 | Crowley | Sept. 29, 1925 |
| 2,131,796 | Day | Oct. 4, 1938 |
| 2,214,083 | Lester | Sept. 10, 1940 |
| 2,336,873 | Lindberg | Dec. 14, 1943 |
| 2,362,351 | Burmeister et al. | Nov. 7, 1944 |